3,034,402
HINGED ARTICULATION WITH ELASTIC REACTION FOR TEMPLES OF SPECTACLES
Umberto Alberetti, Milan, Italy, assignor to La Meccanoptica Leonardo S.p.A., Milan, Italy, an Italian company
Filed Oct. 18, 1957, Ser. No. 690,990
Claims priority, application Italy Oct. 18, 1956
3 Claims. (Cl. 88—53)

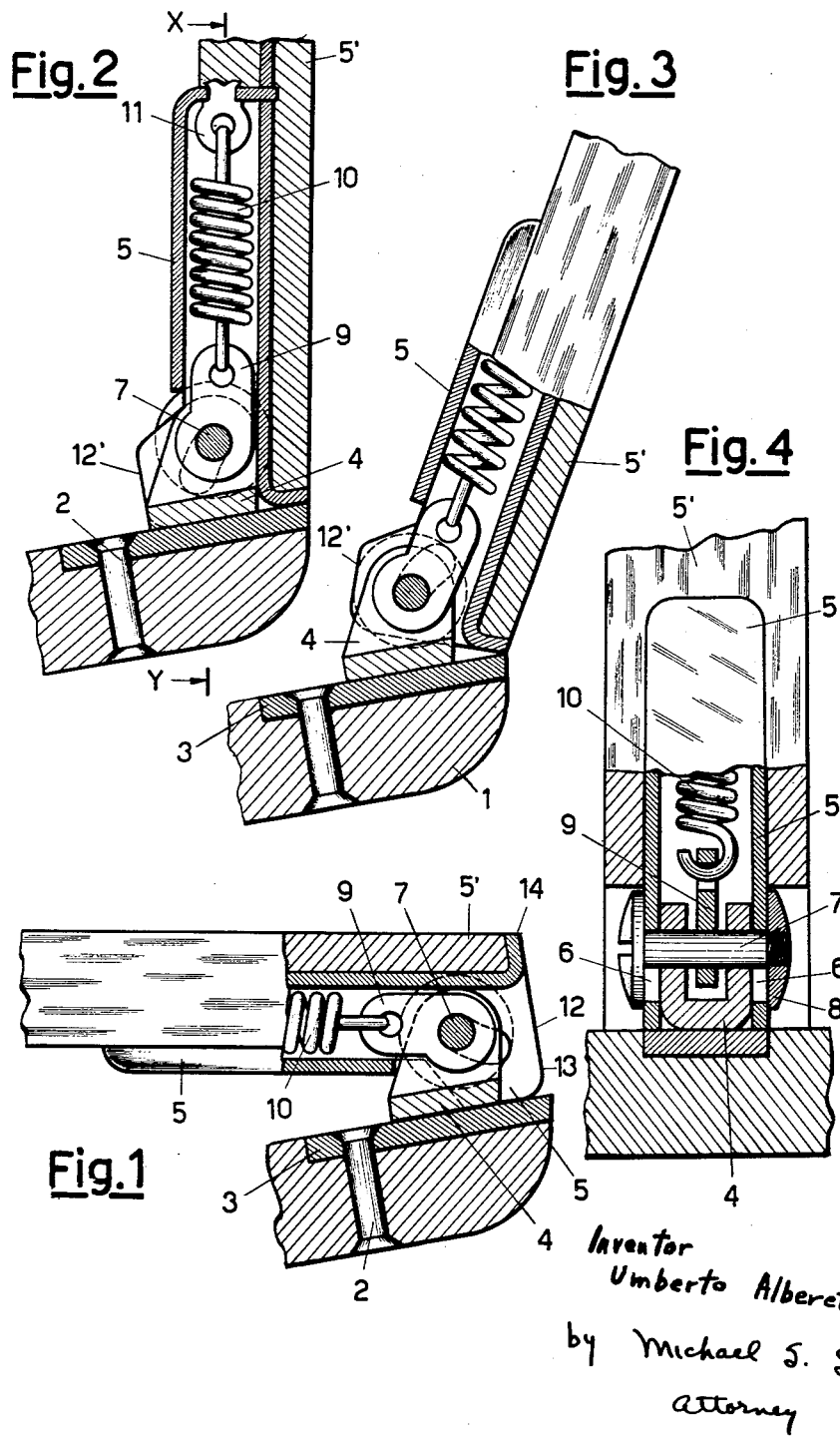

The invention relates to an articulation for hinging the individual temple members to the frames carrying the lenses of spectacles.

The articulation is essentially composed of two elements connected with each other hingedly and fixed respectively the one to the frame member; and the other to the temple member. The end of one of said elements is terminated with two plane faces orthogonal to each other and oriented in such a way as to coincide with the plane of the other elements respectively in the two "open" and "closed" final positions of the temple member. The bore, passed through by the pin, in only one of the two elements, has elongated shape, and a spring, interposed between the pin and the extension of said element, tends to return elastically one element against the other, towards one of the two final positions.

It is apparent that any angular displacement of the temple member, for instance between the two final positions of closure and opening, causes the axial relative translation of the temple member with respect to the frame member and therewith the loading of the spring which tends to return elastically the two elements towards one or the other of the final positions as soon as the displacing action has ceased. The loading of the spring also occurs if the temple member surpasses the open position, whence the temple member, tending to return towards the final, stable, position, exerts a slight pressure upon the temple and so permits better and more stable adaptation of the spectacles to the face.

Almost all the parts of the articulation can be obtained by cutting and bending flat metal sheets, thus affording greater ease of construction and good duration at low cost.

In order that the present invention may be readily carried into effect, it will now be described with reference to the accompanying drawings, wherein:

FIG. 1 is a view of an embodiment of the articulation of the present invention partly in section and seen in "closed" position, that is, with the temple member substantially parallel to the plane of the lens-carrying frame member;

FIG. 2 is a view of the embodiment of the articulation of FIG. 1 partly in section and seen in the "open" position, that is, with the temple member substantially orthogonal to the plane of the frame member;

FIG. 3 is a view of the embodiment of the articulation of FIG. 1, partly in section, with the temple member slightly diverged, that is, beyond the aforesaid orthogonal position; and FIG. 4 is a section taken along the plane X—Y of FIG. 2.

At the end of the frame member 1 carrying the lenses, there is fixed, for instance with a rivet 2, a hinge element 3 terminated by a fork 4 open upwards. External to the fork 4, the other hinge element 5, which also is terminated by a fork and shaped like a box or case, is fixed to the rod 5' and is perforated transversely by elongated holes 6, while a pin 7 connects the two elements with sufficient play so that said elements are enabled to rotate freely between the head of the pin and a stop nut 8.

The nose member 9 has a portion embracing the pin 7 in the middle line of the fork 4 and serves to anchor it to the spring 10 which is hooked with its other end to the aforesaid case 5 by means of the ring 11 and which spring has a slight initial tension.

The case 5 is terminated at bottom by the faces 12—12' which are plane and substantially orthogonal to each other and resting alternately against the plane of the element 3 of the frame member. The faces 12—12' are equidistant from the axis of the pin 7 and are oriented in such a way as to constitute the surfaces of coincidence with the element 3 respectively in two stable "closed" and "open" positions indicated in FIGS. 1 and 2.

The plane faces 12—12' have the intersecting edge 13 and the outer edge 14 at a distance from the pin greater than that of the planes of said faces. Hence, on rotating the temple member between the position of FIG. 1 and that of FIG. 2, the two elements keep contact only with edge 13, thereby causing the longitudinal displacement of the temple member and the loading of the spring that returns said temple member towards one of the two stable "final" positions as soon as the above mentioned displacing action ceases. Analogous things happen if the temple member is diverged, as in FIG. 3, resting with the edge 14 on the plane of the element 3.

Of course the invention may be embodied in many other different ways without departing thereby from the scope of the invention as summarized in its essentials in the appended claims.

Without further analysis, the foregoing will so fully reveal the gist of the present invention that others can by applying current knowledge readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a spectacle frame assembly, in combination, a lens frame member; a temple member; pivot means mounted on said members and connecting the same to each other turnably between a folded position in which said members are substantially adjacent each other, a first turned position in which said members are turned at a first angle relative to each other and a second turned position in which said members are turned at a second angle greater than said first angle relative to each other, said pivot means comprising a pivot pin and means supporting said pivot pin in one of two positions in relation to said members, said pivot being in a first of its two positions during any angular turning of said members from said folded position to said first turned position; spring means affixed at one end to one of said members at a point spaced from said pivot pin and coupled at the other end to said pivot pin, said spring means being inactive in the first position of said pivot pin and being active in the second of the two positions of said pivot pin; and abutment means on said members arranged to cooperate in such a manner as to urge said pivot pin into the second position thereof when said members are turned at an angle greater than said first angle in relation to each other thereby activating said spring means to turn said members relative to each other from said second turned position thereof into said first turned position thereof without tending to turn them further into said folded position thereof and without preventing manual turning of said temple member relative to said lens frame member from said first turned position into said folded position thereof.

2. In a spectacle frame assembly, in combination, a lens frame member; a temple member; pivot means mounted on said members and connecting the same to each other turnably between a folded position in which said members are substantially adjacent each other, a first turned position in which said members are turned at substantially ninety degrees relative to each other and a second turned position in which said members are turned at a second angle greater than ninety degrees relative to each other, said pivot means comprising a pivot pin and means supporting said pivot pin in one of two positions in relation to said members, said pivot pin being in a first of its two positions during any angular turning of said members from zero to ninety degrees; resilient means affixed at one end to one of said members at a point spaced from said pivot pin and coupled at the other end to said pivot pin, said resilient means being inactive in the first position of said pivot pin and being active in the second of the two positions of said pivot pin and tending when active to turn said members relative to each other from said second turned position thereof into said first turned position thereof without tending to turn them further into said folded position thereof and without preventing manual turning of said temple member relative to said lens frame member from said first turned position into said folded position thereof; and abutment means on said members arranged to cooperate in such a manner as to urge said pivot pin into the second position thereof when said members are turned at an angle greater than ninety degrees in relation to each other thereby activating said resilient means.

3. In a spectacle frame assembly, in combination, a lens frame member; a temple member; pivot means mounted on said members and connecting the same to each other turnably between a folded position in which said members are substantially adjacent each other, a first turned position in which said members are turned at substantially ninety degrees relative to each other and a second turned position in which said members are turned at a second angle greater than ninety degrees relative to each other, said pivot means comprising a pivot pin and means supporting said pivot pin in one of two positions in relation to said members, said pivot pin being in a first of its two positions during any angular turning of said members from zero to ninety degrees; resilient means affixed at one end to one of said members at a point spaced from said pivot pin and coupled at the other end to said pivot pin, said resilient means being inactive in the first position of said pivot pin and being active in the second of the two positions of said pivot pin and tending when active to turn said members relative to each other from said second turned position thereof into said first turned position thereof without tending to turn them further into said folded position thereof and without preventing manual turning of said temple member relative to said lens frame member from said first turned position into said folded position thereof; abutment means on said members arranged to cooperate in such a manner as to urge said pivot pin into the second position thereof when said members are turned at an angle greater than ninety degrees in relation to each other thereby activating said resilient means; and engaging means on one of said members and two engaging faces on the other of said members, one of the engaging faces of the other of said members being adapted to engage said engaging means when said members are in said folded position and the other of said engaging faces being adapted to engage said engaging means when said members are in said first turned position.

References Cited in the file of this patent
UNITED STATES PATENTS

| | | |
|---|---|---|
| 158,063 | Grimm | Dec. 22, 1874 |
| 1,191,855 | Tuszka | July 18, 1916 |
| 1,352,379 | Pounder | Sept. 7, 1920 |
| 2,478,529 | Farr et al. | Aug. 9, 1949 |
| 2,805,661 | Pollock | Sept. 10, 1957 |
| 2,874,609 | Ducati | Feb. 24, 1959 |

FOREIGN PATENTS

| | | |
|---|---|---|
| 162,502 | Switzerland | Sept. 1, 1933 |
| 454,716 | Italy | Feb. 1, 1950 |